US012667920B2

(12) United States Patent
Gilewski et al.

(10) Patent No.: US 12,667,920 B2
(45) Date of Patent: Jun. 30, 2026

(54) ROBOTIC GASKET INSTALLATION

(71) Applicant: Kimastle Corporation, Chesterfield, MI (US)

(72) Inventors: Kirk E. Gilewski, Algonac, MI (US); Kirk J. Gilewski, Jr., Clay Township, MI (US); Craig Gilewski, Algonac, MI (US); Raymond Kujawa, Allenton, MI (US)

(73) Assignee: Kimastle Corporation, Chesterfield, MI (US)

( * ) Notice: Subject to any disclaimer, the term of this patent is extended or adjusted under 35 U.S.C. 154(b) by 352 days.

(21) Appl. No.: 18/611,010

(22) Filed: Mar. 20, 2024

(65) Prior Publication Data

US 2024/0316703 A1    Sep. 26, 2024

Related U.S. Application Data

(60) Provisional application No. 63/453,393, filed on Mar. 20, 2023.

(51) Int. Cl.
*B23P 19/04* (2006.01)

(52) U.S. Cl.
CPC .................................... *B23P 19/04* (2013.01)

(58) Field of Classification Search
CPC .............................. B23P 19/04; B25B 27/0028
See application file for complete search history.

(56) References Cited

U.S. PATENT DOCUMENTS

| | | | | |
|---|---|---|---|---|
| 4,715,110 | A | * | 12/1987 | St. Angelo ............ B23P 19/047 29/235 |
| 8,261,805 | B2 | | 9/2012 | Lawson |
| 8,783,326 | B1 | | 7/2014 | Vaninger et al. |
| 11,155,129 | B2 | * | 10/2021 | Polster ................ B60C 25/0515 |
| 2012/0267055 | A1 | | 10/2012 | Rogalla et al. |
| 2016/0152102 | A1 | | 6/2016 | Campbell |
| 2022/0324071 | A1 | * | 10/2022 | Lu ......................... B23P 19/084 |

FOREIGN PATENT DOCUMENTS

JP          2010076037 A       4/2010

* cited by examiner

*Primary Examiner* — Jason L Vaughan
*Assistant Examiner* — Amanda Kreiling
(74) *Attorney, Agent, or Firm* — Varnum LLP

(57) ABSTRACT

A robot end of arm tool (EOAT) and installation process for the proper orientation, mounting, and installation of gaskets such as, but not limited to, water-tight and soil-tight gaskets onto work pieces, such as molded pipes is provided. The gasket installation process may comprise multiple stations including a pipe loading station, pipe cutting and deburring station, gasket retrieval station, gasket stretching and alignment station, mounting station, film application station, and barcode placement substation. The pipe moves sequentially through each station to produce a pipe with one or more of gaskets, films, and/or barcodes placed thereon.

20 Claims, 12 Drawing Sheets

106

ROBOTIC GASKET INSTALLATION

CROSS REFERENCE TO RELATED APPLICATIONS

This application claims benefit of U.S. Provisional Application No. 63/453,393 filed on Mar. 20, 2023, and entitled ROBOTIC GASKET INSTALLATION, which is hereby incorporated by reference in its entirety.

TECHNICAL FIELD

The present disclosure generally relates to the mounting and installation of gaskets to a work piece via the use of a robot, and more particularly to the use of a robot end of arm tool (EOAT), also known as an end effector, for the proper orientation, mounting, and installation of gaskets such as, but not limited to, water-tight and soil-tight gaskets onto work pieces, such as molded pipes.

BACKGROUND

Generally, in forming a joint between sections of pipe, the spigot or male end of the pipe body is inserted within the bell or female end of the pipe body. A gasket is typically seated within a pipe spigot groove that is defined by the outer surface of the pipe body at the spigot end. As such, the gasket provides the major seal capacity for the joint, which couples the spigot end of a first pipe section and the bell end of a second pipe section. Thus, it is necessary to ensure proper installation of the gasket.

Traditionally, the installation of a gasket onto the outer surface of a pipe body within a pipe spigot groove, or more broadly the installation of an O-ring into a groove on an outer surface of a workpiece at a workpiece end section, is an intricate manual process requiring input from one or more human operators. As such, known installation processes are typically inefficient, inconsistent, and labor-intensive. For example, known mounting techniques can often result in an O-ring or gasket that is rolled, twisted, or otherwise improperly seated or misaligned within the corresponding groove on the work piece or pipe. Such improper installation adversely affects the ultimate sealing capacity of the pipe.

As such, there is a need for a gasket installation process that is automated, thereby reducing error whilst improving the overall efficiency and consistency of the process. Furthermore, there is a need for a gasket installation apparatus and process that further accounts for diameter variances and irregularities of respective pipes that are used by the system to ensure that installed gaskets are consistently and properly aligned upon the pipes thereby preventing the rolling and/or twisting of gaskets during installation.

BRIEF SUMMARY OF THE INVENTION

The present disclosure is directed to an apparatus and processing unit for installing gaskets onto work pieces such as pipes wherein the outer surface of the pipe or workpiece defines a groove. According to one embodiment of the invention, the gasket installation apparatus may comprise a robotic arm having at least one end of arm tool (EOAT), or end effector coupled thereto. The end of arm tool (EOAT) may comprise a plurality of tools to aid in the gasket installation process, including but not limited to a plurality of gripping elements, wherein the gripping elements are configured to receive and transport a gasket to a mounting station at which it may be applied to a work piece such as a pipe. The apparatus may further comprise a plurality of interconnected rollers and a shoehorn mechanism each coupled to the end of arm tool (EOAT), that are collectively adapted to align and install the gasket into the groove defined by the outer surface of the workpiece or pipe as the end effector rotates about a circumference of the outer surface of the workpiece or pipe.

The gasket installation processing unit may comprise multiple stations including a pipe loading station, a pipe cutting and deburring station, a mounting station including a gasket retrieval substation and a gasket stretching and alignment substation, and a film application station including a barcode placement substation. The plurality of stations and substations are incorporated in an automated system environment that is configured to produce a work piece or pipe with one or more of gaskets, films, and/or barcodes disposed thereon.

The present disclosure further provides that the automated system environment is disposed in an enclosed facility cell associated with the gasket installation process comprising a perimeter fence surrounding each of the respective stations, one or more access doors featuring safety interlocks, and a pipe exit door for easy retrieval of finished pipes without having to enter the enclosed facility cell. Said another way, the gasket installation processing unit disposed within the automated system environment of the present disclosure significantly reduces direct human interaction with the automated process.

BRIEF DESCRIPTION OF THE DRAWINGS

The embodiments set forth in the drawings are illustrative and exemplary in nature and not intended to limit the subject matter. The following detailed description of the illustrative embodiments can be understood when read in conjunction with the following drawings, where like structure is indicated with like reference numerals and in which.

DETAILED DESCRIPTION OF THE INVENTION

Figure 1:
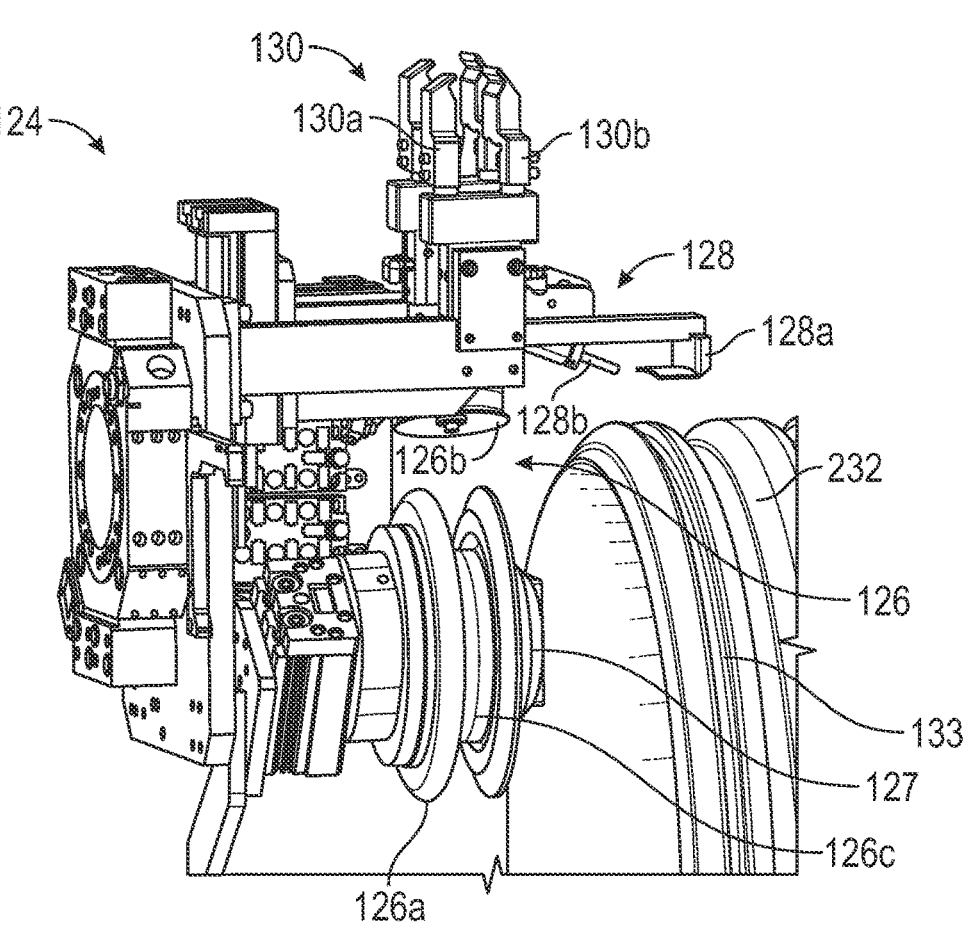
FIG. 1 shows an exemplary end of arm tool (EOAT) for the installation of soil-tight gaskets.

While the present disclosure may be described with respect to specific applications or industries, those skilled in the art will recognize the broader applicability of the disclosure.

Those having ordinary skill in the art will recognize the terms such as "a", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims. Any numerical designations, such as "first" or "second" are illustrative only and are not intended to limit the scope of the disclosure in any way.

The following discussion and accompanying figures disclose an apparatus 120 and processing unit 100 for the installation of gaskets 234, 236 onto workpieces such as pipes 232. It is contemplated that the installed gasket 234, 236 may be an annular, ring-shaped member formed of flexible elastomeric material, such as a suitable rubber or other material known to individuals skilled in the relevant art. The gasket 234, 236 may be a water-tight gasket configured to be positioned onto substantially water-tight pipes, a soil-tight gasket configured to be positioned onto substantially soil-tight pipes, or another gasket otherwise designed for a specific intended application or purpose. The corresponding pipe 232 onto which the gasket 234, 236 is installed may be formed of a polymer material, such that the same is substantially water-tight and/or soil-tight. For example, the pipe 232 may be formed of a high-density polyethylene, polypropylene, polyvinyl chloride, or other suitable material known to individuals skilled in the relevant art. The pipe 232 may be a corrugated or smooth-walled pipe. While the apparatus 120 and process 100 are illustrated and described herein for the installation of gaskets, such as elastomeric water-tight and/or soil-tight gaskets positioned onto polymeric molded pipes, it will be understood that the present apparatus 120 and process 100 may be used for the installation of many different types of toric joints onto a variety of corresponding work pieces in a manner similar to that described herein.

In a general sense, the gasket installation apparatus 120 of the present disclosure is configured to mount gaskets 234, 236 onto molded pipes 232. The gasket installation process 100 of the present disclosure comprises multiple stations and substations 102-108 incorporated together to produce a pipe 232 with one or more of gaskets, films, and/or barcodes disposed thereon. More particularly, the gasket installation apparatus 120 and process 100 of the present disclosure is designed to ensure installed gaskets 234, 236 are consistently and properly aligned thereby preventing the rolling and/or twisting of gaskets during installation. The gasket installation process 100 is envisioned to mount a variety of gaskets onto a range of pipe diameters. Furthermore, the gasket installation process 100 of the present disclosure is intended to be disposed and operated within an enclosed facility cell 101 comprising a perimeter fence 110a surrounding each of the stations 102, 103, 104, 105, 106, 107, 108, one or more access doors featuring safety interlocks 110b, and pipe exit door 109 for easy retrieval of finished pipes without having to enter the facility cell 101.

More particularly, referring now to the drawings, wherein like reference numerals refer to like components, an apparatus 120 of the present disclosure is shown and described in FIGS. 1-4. To carry out the gasket installation process, the apparatus 120 of the present disclosure may comprise a robotic arm 122 having end of arm tool (EOAT) or end effector 124, 224. The robotic arm 122 may be a robot that is known to individuals skilled in the relevant art, having several axes and/or degrees of freedom to carry out the tasks as described in the various stations herein (e.g., rotate 360 degrees about the perimeter of a pipe to install a gasket thereon at the mounting station 106). Examples of commercially available industrial robots having several axes and/or degrees of freedom as described herein are available from FANUC America, i.e., a FANUC robot, ABB, KUKA, Kawasaki, and Mitsubishi.

The robotic end of arm tool (EOAT) or end effector 124, 224 may comprise a plurality of tools tailored to the respective gasket properties. The tools coupled to the end of arm tool (EOAT) 124, 224 are designed to be tailorable in order to account for potential differences in the gasket properties, such as geometric properties. For example, as shown in FIG. 1, an end of arm tool (EOAT) 124 for the installation of soil-tight gaskets 234 (gaskets resilient to infiltration of soil, sand, and other small particles, commonly used in underground applications as shown by example in FIG. 8) may include a plurality of soil-tight adapted interconnected geometric rollers 126, a soil-tight adapted shoehorn mechanism 128, and a plurality of soil-tight adapted gasket gripping elements 130 coupled thereto.

More specifically, the plurality of soil-tight adapted interconnected geometric rollers may comprise a primary roller 126a and secondary roller 126b. The primary and secondary rollers 126a, 126b function to ensure proper alignment and installation of the gasket 234 such that the body of the gasket 234 maintains a substantially uniform compressive force upon the outer surface of the pipe 232 about a substantial entirety of a circumference of the pipe 232. The soil-tight adapted shoehorn mechanism 128 comprises a shoehorn element 128a and pin element 128b. The shoehorn and pin elements 128a, 128b function, along with the plurality of interconnected rollers 126a, 126b to ensure proper alignment and installation of the gasket 234. More specifically, the shoehorn mechanism 128 contacts and maintains pressure on an exterior surface of the gasket 234 guiding the gasket into the pipe spigot groove 133 as the end of arm tool (EOAT) 124 rotates about the pipe 232. During rotation, the primary roller 126a receives a portion of the gasket 234 within the primary roller track 126c. The secondary roller 126b contacts the outside edge of the gasket 234, thereby pushing the gasket 234 into alignment within the pipe spigot groove 133. As such, the primary roller 126a, secondary roller 126b, and shoehorn mechanism 128 work together to properly position the gasket 234 onto and about the pipe 232 absent twisting, rolling, or another form of misalignment.

Figure 2:
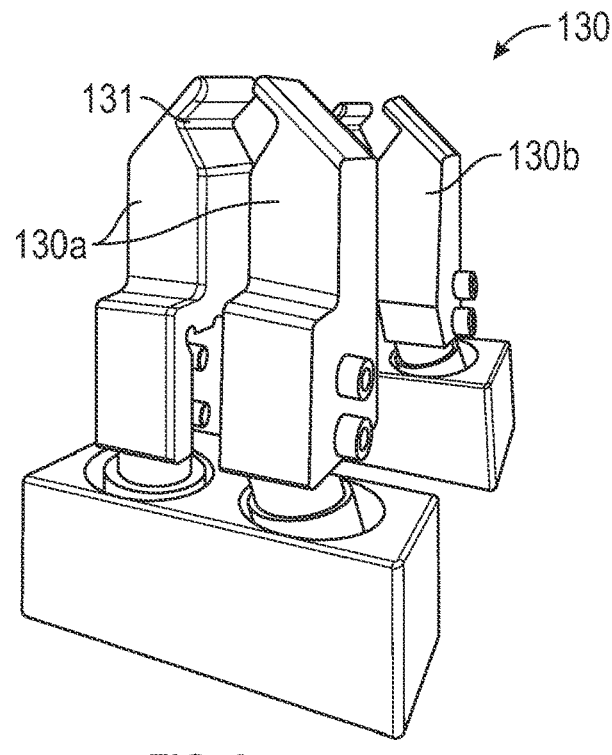
FIG. 2 shows a plurality of exemplary gripping elements for soil-tight gaskets.

As further shown in FIG. 2, the plurality of gripping elements 130, configured as soil-sight gripping elements, function to grasp, carry, and place the soil-tight gasket 234 onto the pipe or within various stations or substations throughout the gasket installation process 100. The plurality of gripping elements 130 may each include a first arm 130a and a second arm 130b, such that each arm defines an inner surface thereof, and the inner surface of the respective arm further defines at least one notch 131. The notch 131 of the first arm 130a and the notch of the second arm 130b are collectively adapted to receive and secure the gasket therebetween. Said another way, the gasket 234 is thereby inserted into the space between the first and second arms 130a, 130b and the outer edges of the gasket 234 are received by the first and second arm notches 131 to confirm proper initial placement and orientation of the gasket 234 upon the pipe 232. For example, the plurality of soil-tight adapted gripping elements 130 may be employed to initially place the gasket 234 onto the pipe 232 by grasping the outer edges of the respective gasket 234 and lifting the gasket 234 onto the pipe 232.

Figure 3:
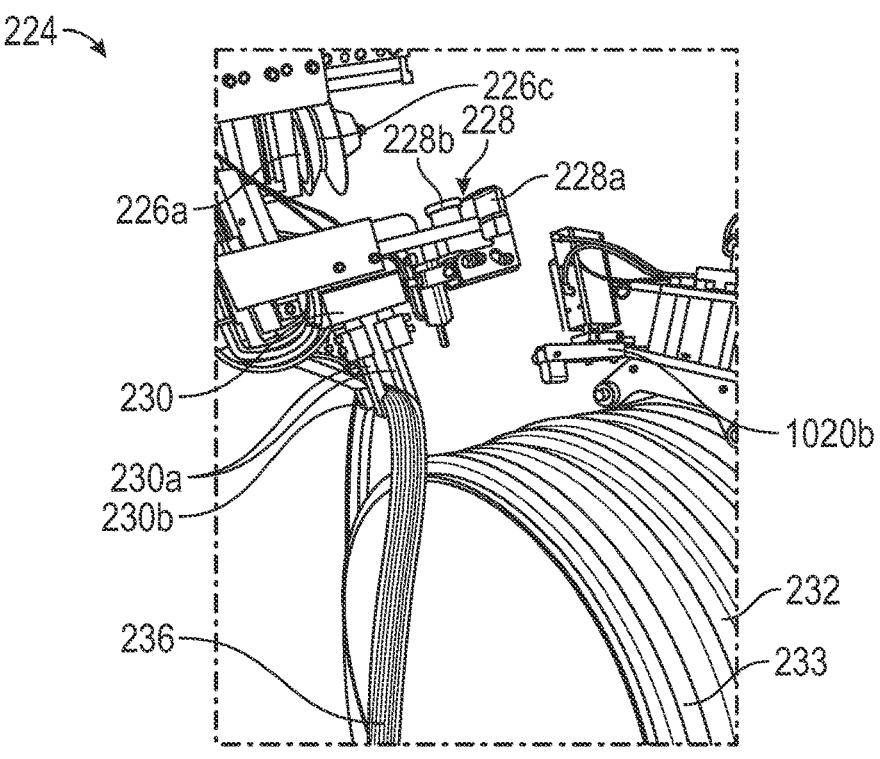
FIG. 3 shows an exemplary end of arm tool (EOAT) for the installation of water-tight gaskets.

As shown in FIG. 3, an exemplary end of arm tool (EOAT) 224 for the installation of water-tight gaskets 236 (gaskets designed to prevent the infiltration and exfiltration of water or other liquids) may include a plurality of water-tight adapted interconnected geometric rollers 226, a water-tight adapted shoehorn mechanism 228, and one or more pairs of water-tight adapted gasket gripping elements 230 coupled thereto.

More specifically, the plurality of water-tight adapted interconnected geometric rollers may comprise a primary roller 226a and secondary roller 226b. The primary and secondary rollers 226a, 226b function to ensure proper alignment and installation of the water-tight gasket 236 such that the body of the gasket 236 maintains a substantially uniform compressive force upon the outer surface of the pipe 232 about a substantial entirety of a circumference of the pipe 232. The water-tight adapted shoehorn mechanism 228 comprises a shoehorn element 228a and roller element 228b. The shoehorn and roller elements 228a, 228b function, along with the plurality of interconnected rollers 226a, 226b, to ensure proper alignment and installation of the gasket 236. More specifically, the shoehorn mechanism 228 contacts and maintains pressure on an outside surface of the gasket 236, guiding the gasket into the pipe spigot groove 233 as the end of arm tool (EOAT) 224 rotates clockwise around the pipe 232. During rotation, the primary roller 226a receives a portion of the gasket 236 within the primary roller track 226c. The secondary roller 226b contacts the outside edge of the gasket 236, thereby pushing the gasket 236 into alignment within the pipe spigot groove 233. As such, the primary roller 226a, secondary roller 226b, and shoehorn mechanism 228 work together to properly position the gasket 236 onto and about the pipe 232 absent twisting, rolling, or another form of misalignment.

Figure 4:
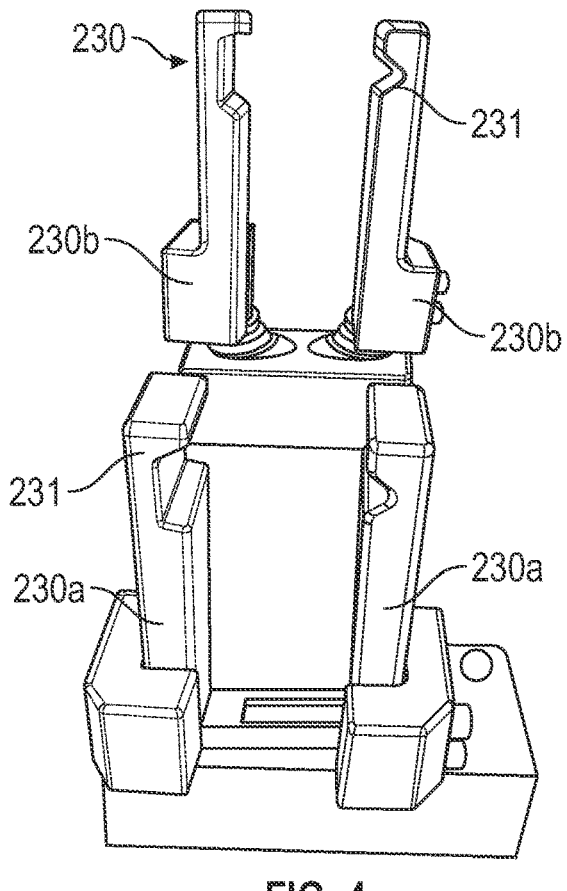
FIG. 4 shows a plurality of exemplary gripping elements for water-tight gaskets.

Lastly, as shown in FIG. 4, the plurality of gripping elements 230, configured as water-tight gripping elements, function to grasp, carry, and place the water-tight gasket 236 onto the pipe 232 or within various stations or substations throughout the gasket installation process 100. The plurality of gripping elements 230 may each include a first arm 230a and a second arm 230b, such that each arm defines an inner surface thereof, and the inner surface of the respective arm further defines at least one notch 231. The notch 231 of the first arm 230a and the notch of the second arm 230b are collectively adapted to receive and secure the gasket therebetween. Said another way, the gasket 236 is thereby inserted into the space between the first and second arms 230a, 230b and the outer edges of the gasket 236 are received by the first and second arm notches 231 to confirm proper initial placement and orientation of the gasket 236 upon the pipe 232. The gasket 236 is inserted into the space between the first and second arms 230a, 230b and the outer edges are received by the first and second arm notches 231 to ensure proper initial placement and orientation of the gasket 236. For example, the plurality of water-tight adapted gripping elements 230 may be employed to initially place the gasket 236 onto the pipe 232 by grasping the outer edges of the respective gasket 236 and lifting the gasket 236 onto the pipe 232.

Figure 5:
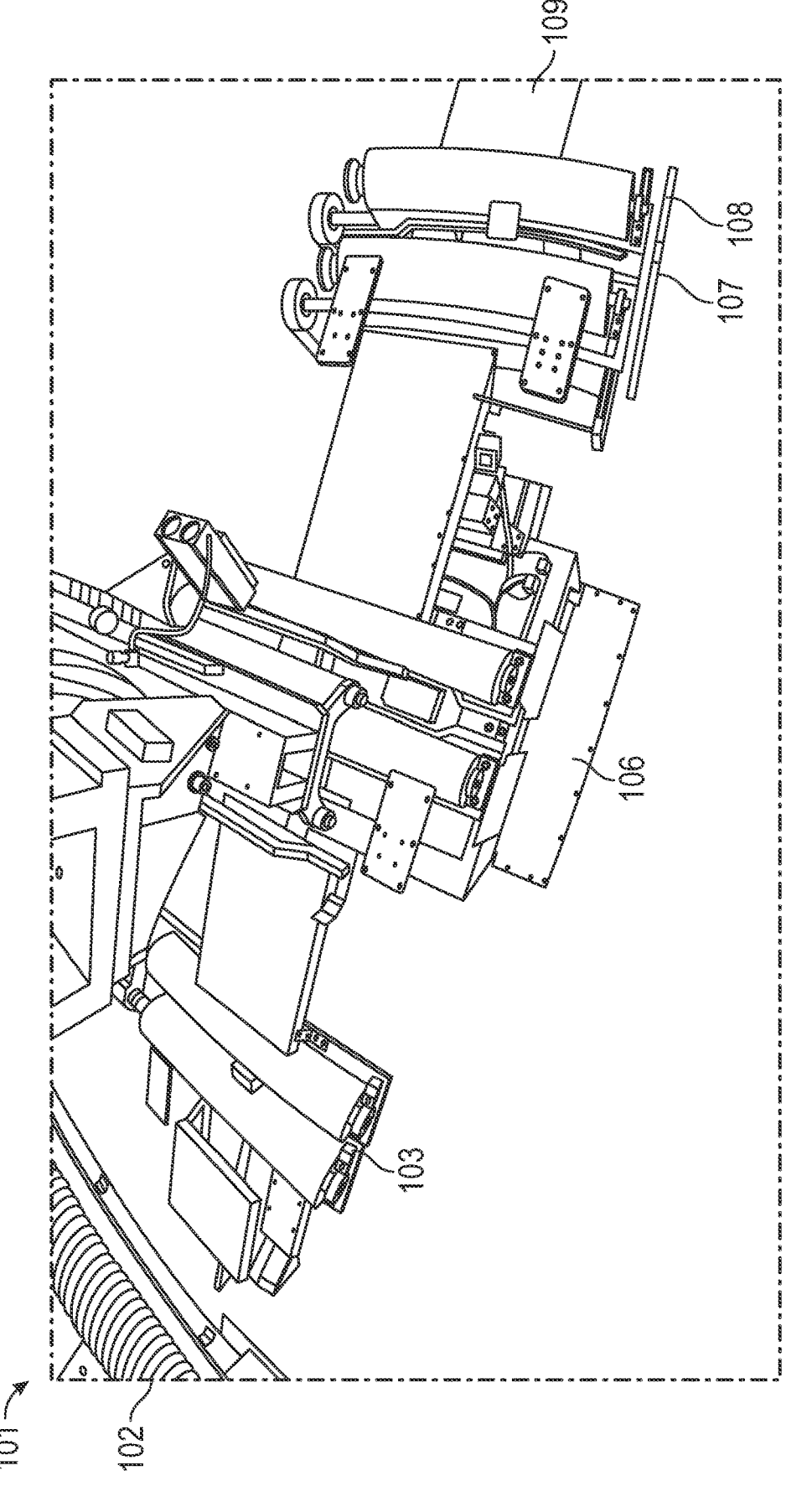
FIG. 5 is a schematic plan view of an example gasket installation process facility cell of the present disclosure comprising multiple stations.

It is contemplated that additional tooling may be included on one of and/or each of the end of arm tools (EOAT) 124, 224 for soil-tight and water-tight gaskets 234, 236 to carry out the gasket installation process 100 as described herein. Gasket Installation Process Turning now to the gasket installation process, FIG. 5 shows an illustrative diagram of an example gasket installation facility cell 101 comprising multiple stations, namely, a pipe loading station 102, a pipe cutting and deburring station 103, a gasket retrieval substation 104 (FIG. 7-8), a gasket stretching and alignment substation 105 (FIG. 9), a mounting station 106 (FIGS. 10A-10E), a film application station 107, and a barcode application station 108. In one example, the process 100 is initiated within the gasket installation facility cell 101, at the pipe loading station 102, wherein the pipe 232 is loaded into the facility cell 101, either manually or via machine assistance.

Once loaded, the pipe 232 then moves sequentially throughout the remaining process stations 103-108 via multiple roller units and platforms and terminates at the pipe exit door 109, such that the process 100 results in a pipe 232 with one or more of gaskets, films, and/or barcodes disposed thereon. It is contemplated that process stations 102-108 of the gasket installation process 100 may operate in any sequential order. A perimeter fence 110a featuring access doors 110b encloses each of the stations 102-108 of the facility cell 101.

Process Control System

The gasket installation process 100 is facilitated using a process control system. The process control system may comprise one or more robots and associated controllers, one or more servo rotary actuators and associated controllers, one or more Human Machine Interfaces (HMI), and a vision system, e.g., a plurality of cameras, and other like and associated devices or hardware (e.g., cables, controllers, networks, software, monitors) necessary to carry out the intended function and/or instruction of such devices. For example, the process control system may comprise a system controller that includes a processor and a non-transitory computer readable medium that stores a set of computer executable instructions that, when executed by the processor, controls the independent stations, substations, or units 102-109 of the gasket installation process.

More particularly, the system controller may comprise a non-transitory computer readable medium. The term non-transitory computer readable medium includes any medium that participates in providing data (e.g., instructions), which may be read by a computer. Such instructions may be utilized to control the gasket installation process and/or the efficiency of one or more of the independent stations, substations, or units 102-109 thereof. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read, as well as networked versions of the same. The non-transitory computer readable medium stores or has written or embodied thereon a set of computer executable instructions that comprise the present process for preparing and installing gaskets onto workpieces.

The system controller may further comprise at least one processor configured to execute the computer executable instructions embodied on the non-transitory computer readable medium. Computer-executable instructions may be compiled or interpreted from computer programs, software code, or algorithms created using a variety of programming languages and/or technologies, including, without limitation, and either alone or in combination, Java™, C, C++, Visual Basic, Java Script, Perl, html, etc.

In general, the processor (e.g., a microprocessor) receives instructions, e.g., from a memory, a computer-readable medium, etc., and executes these instructions, thereby facilitating one or more processes within the process stations 102-109 of the gasket installation facility cell 101, including: instructing the loading of a pipe 232 into the gasket installation facility cell 101 at pipe loading station 102; actuating the knife blade to cut the inner liner of the pipe 232 about the inner perimeter, and actuating the deburring mechanism to remove raised edges and unwanted pieces of pipe 232 within the pipe cutting and deburring station 103; actuating the movement of the plurality of gripping elements 130, 230 of the robotic arm 122 to retrieve a gasket 234, 236 from the gasket retrieval substation 104 and transport to the gasket stretching and alignment substation 105; within the gasket stretching and alignment substation 105, actuating the extension of bottom stretching pin 1018 of the stretching device 1014 in a downward vertical direction to effectuate the pre-stretching of the gasket to a predetermined length, and actuating the retraction of the bottom stretching pin 1018 of the stretching device 1014 to effectuate removal of said gasket 234, 236; actuating the movement of plurality of gripping elements 130, 230 of the robotic arm 122 to retrieve the gasket 234, 236 from the gasket stretching and alignment substation 105 and transport said gasket 234, 236 to the top portion of a pipe 232 at the pipe spigot groove 133, 233 within the mounting station 106; actuating the extension and retraction of the one or more pressing arms 1020a, 1020b of the pressing device 1019 to exert pressure onto the gasket 234, 236 and hold the respective gasket 234, 236 within the pipe spigot groove 133, 233, and actuating the movement of the plurality of interconnected geometric rollers 126, 226 and shoehorn mechanism 128, 228 to mount a gasket 234, 236 within the pipe spigot groove 133, 233 of a pipe 232 at the mounting station 106; instructing the application of at least one film at film application station 107; instructing the application of at least one barcode at barcode application station 108; and instructing the exit of the pipe 232 through the pipe exit door 109 of the gasket installation facility cell 101.

For example, and as further detailed herein below in the following sections, during the mounting of the pipe 232 within the pipe spigot groove 133, 233 at mounting station 106, the system controller may instruct the operation of the end of arm tool (EOAT) 124, 224 such that commands are transmitted to the end of arm tool (EOAT) 124, 224 to regulate its movements and orientation as needed to ensure accurate positioning of the gasket 234, 236 onto the pipe 232. Through the vision system 1015, 1021, the process control system can also manage the functionality of the cameras, adjusting their settings, angles, and focus to facilitate precise monitoring and inspection of the gasket installation process 100. Additionally, the control system can coordinate the actions of the vision system 1015, 1021 with other components of the installation process 100.

Although the gasket installation process 100 functions autonomously, i.e., without routine human operator interaction, the process control system of the present disclosure can be paused, stopped, or otherwise controlled by an operator via the Human Machine Interface (HMI) and settings for each of the stations 102-109 may be adjusted at a remote location by a remote human operator based on a set of predetermined configuration preferences.

Pipe Loading Station

Figure 6:
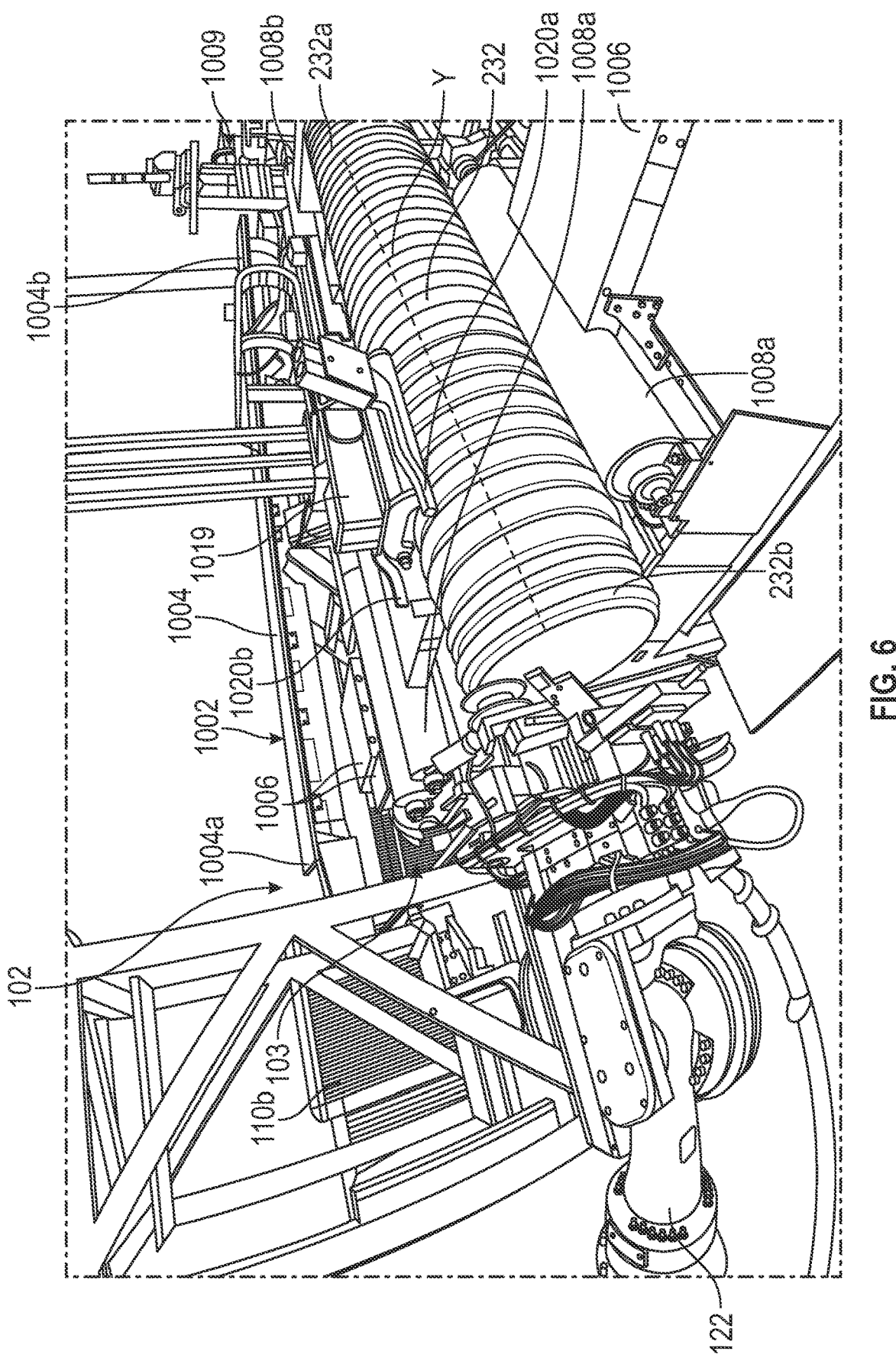
FIG. 6 shows an exemplary pipe loading station and pipe cutting and deburring station of the present disclosure.

One example of the gasket installation process 100 begins with the pipe loading station 102. As illustrated in FIG. 6 the pipe loading station 102 may comprise a pipe loading conveyor system 1002. The pipe loading conveyor system 1002 may include a conveyor belt and one or more actuators. The pipe loading station 102, via the pipe loading conveyor system 1002, functions to receive and thereby move a respective pipe 232 into the gasket installation facility cell 101 to begin the gasket installation process 100. More specifically, the bell end (female end) 232a of the pipe 232 may be inserted first and fed onto the conveyor belt 1004 of the pipe loading conveyor system 1002, either manually or via machine assistance. The conveyor belt 1004 moves the pipe 232 along a longitudinal length of the conveyor belt 1004, wherein such length extends longitudinally between its opposing ends 1004a, 1004b. The pipe 232 is fully received onto the conveyor belt 1004 when e.g., the bell end (female end) 232a is at or near a first opposing end 1004a of the conveyor belt and the spigot end (male end) 232b is at or near a second opposing end 1004b of the conveyor belt.

It is contemplated that the conveyor belt 1004 of the pipe loading conveyor system 1002 may be any suitable conveyor belt known to individuals skilled in the relevant art, to carry out the intended function described herein. For example, the conveyor belt may be configured from a single continuous loop of flexible material (e.g., a rubber belt). Alternatively, the conveyor belt may be configured from a plurality of belt links, which are connected together in a loop. The conveyor belt may have a generally flat and smooth carrying surface.

The one or more actuators function to move the pipe 232 to the next adjacent station (e.g., the pipe cutting and deburring station 103) by raising and/or titling the conveyor system 1002. More specifically, the one or more actuators may be configured to adjust and change the position and/or orientation of the conveyor system 1002. For example, the actuators may be configured to adjust the vertical height of the conveyor system 1002 to accommodate receiving the pipe 232 or moving the pipe 232 to the next station. In addition, the one or more actuators may be configured to tilt one lateral side (and its opposing end 1002a, 1002b) of the conveyor system 1002 in a position higher than the opposing lateral side (and its opposing end 1002a, 1002b), such that the pipe 232 rolls off of the lower-positioned lateral side, thereby advancing the pipe 232 to a platform unit 1006 adjacent to the next station (the pipe cutting and deburring station 103).

The platform unit 1006 may comprise one or more platforms that independently or collectively raise or lower in position to aid in the advancement of the pipe 232 to the next adjacent station (e.g., the pipe cutting and deburring station 103). Once the pipe 232 is advanced to the platform unit 1006, a subsequent pipe 232 may be loaded on to the pipe loading conveyor system 1002 to thus re-start the process for the subsequent pipe 232.

Pipe Cutting and Deburring Station

Next, the pipe 232 is temporarily advanced to the platform unit 1006 adjacent the pipe cutting and deburring station 103 before advancing into such station. As seen in FIG. 6, the pipe cutting and deburring station 103 may comprise a plurality of parallel pipe-holding rollers 1008, a knife cutting and deburring system 1009, and a conveyor belt 1010. The plurality of parallel pipe-holding rollers 1008 may comprise at least two rollers positioned adjacent to each other, wherein the respective rollers function to maintain the pipe 232 in the space therebetween. In one non-limiting example, a first and second set of parallel pipe-holding rollers 1008a, 1008b are utilized. In such an example, the first set of parallel pipe-holding rollers 1008a is positioned substantially parallel to the pipe's longitudinal axis Y proximate the spigot end (male end) 232b of the pipe 232. The second set of parallel pipe-holding rollers 1008b is positioned substantially parallel to the pipe's longitudinal axis Y proximate the bell end (female end) 232a of the pipe 232. Placement of the sets of rollers 1008a, 1008b near the ends of the pipe 232 promote placement of the pipe 232 within the pipe cutting and deburring station 103 along a longitudinal length of the pipe body L from its bell end 232a and its spigot end 232b. The plurality of pipe-holding rollers 1008 are configured to rotate, such that the pipe 232 thereby correspondingly rotates therewith. It is also contemplated that the plurality of pipe holding rollers 1008 may be driven by a motoring device such that the plurality of pipe-holding rollers are actively rotatable.

Once rotation of the plurality of parallel pipe-holding rollers 1008 commence, thereby causing the pipe 232 to rotate, the knife cutting and deburring system 1009, located at the bell end 232a of the pipe 232, functions to cut the bell end 232a of the pipe 232 and perform the deburring operation. More specifically, the knife cutting and deburring system 1009 comprises one or more robots and servo rotary actuators with a clamp, knife, and deburring mechanism. During rotation, the robot arm with knife blade attached thereto extends into the void of the pipe 232 and the clamp functions to hold the pipe 232 in place, to prevent any unwanted movement while the knife blade cuts the inner liner of the bell end 232a of the pipe 232 about the inner perimeter of the pipe 232. The deburring operation may also be performed after the inner liner is cut by the blade, to aid the removal of raised edges and unwanted pieces of pipe material left by the initial cutting process. Once the liner is cut by the blade, the pipe 232 is unclamped and the cut portion of the liner is disposed onto a conveyor belt 1010 for removal externally (to a location outside the perimeter fence 110a of the gasket installation facility cell 101).

The pipe is then advanced temporarily to a platform unit 1006 adjacent the next station (the gasket mounting station 106) via a retractable pushing mechanism 1007 disposed between the two parallel pipe holding rollers 1008. The pushing mechanism raises, thereby causing the pipe to disengage from its seated position and roll onto the adjacent platform unit 1006. The platform unit 1006 may comprise one or more platforms that independently or collectively raise or lower in position to aid in the advancement of the pipe 232 to the next adjacent station (the gasket mounting station 106) while the gasket 234, 236 undergoes preliminary prepping at the gasket retrieval substation 104 and the gasket stretching and alignment substation 105.

Gasket Retrieval Substation

Prior to installation of the gasket 234, 236 onto the pipe 232 executed at the gasket mounting station 106, two substations, i.e., the gasket retrieval substation 104 and the gasket stretching and alignment substation 105, prepare the gasket 234, 236 for assembly onto the pipe 232.

Figure 7:
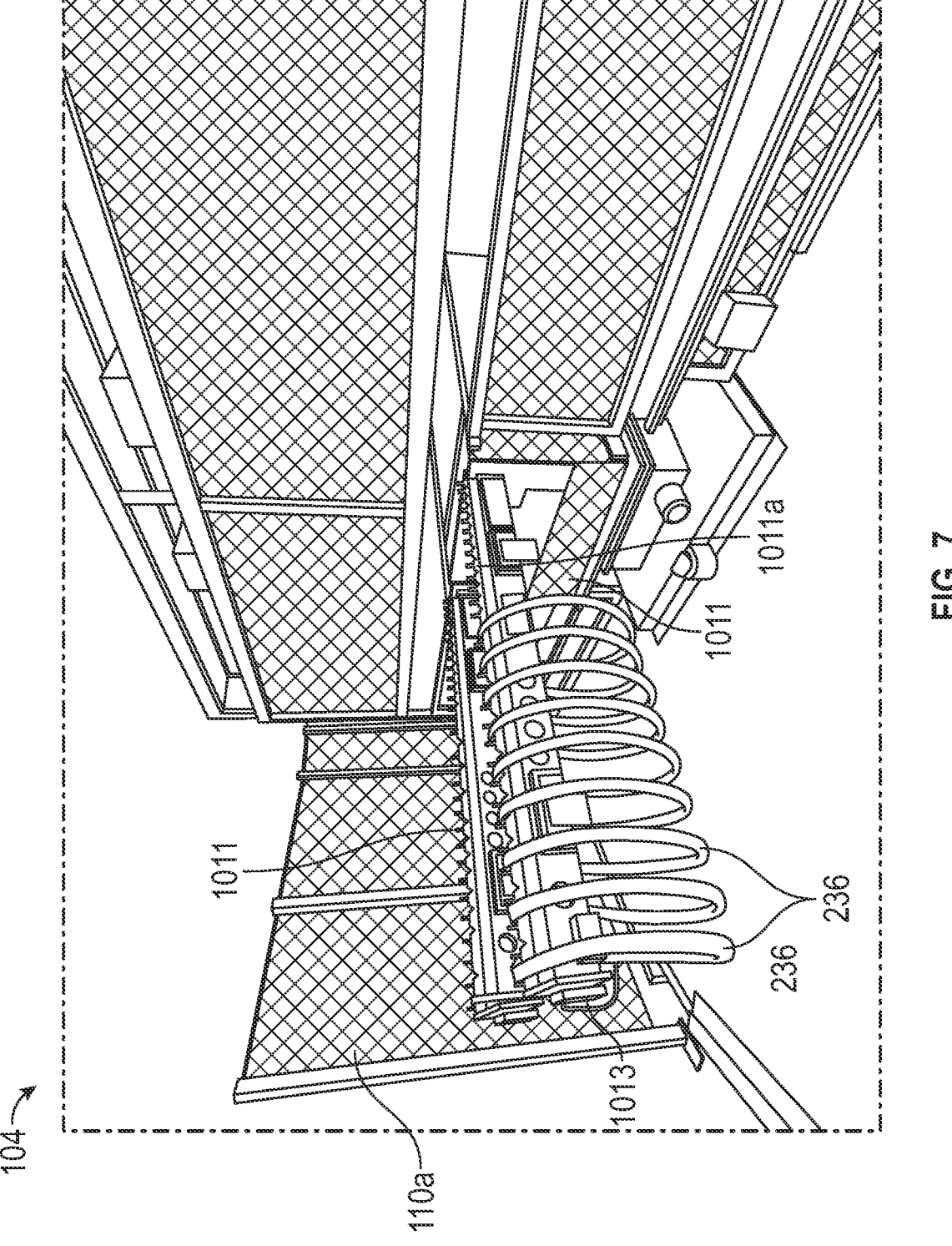
FIG. 7 shows an exemplary gasket retrieval substation of the present disclosure.
Figure 8:
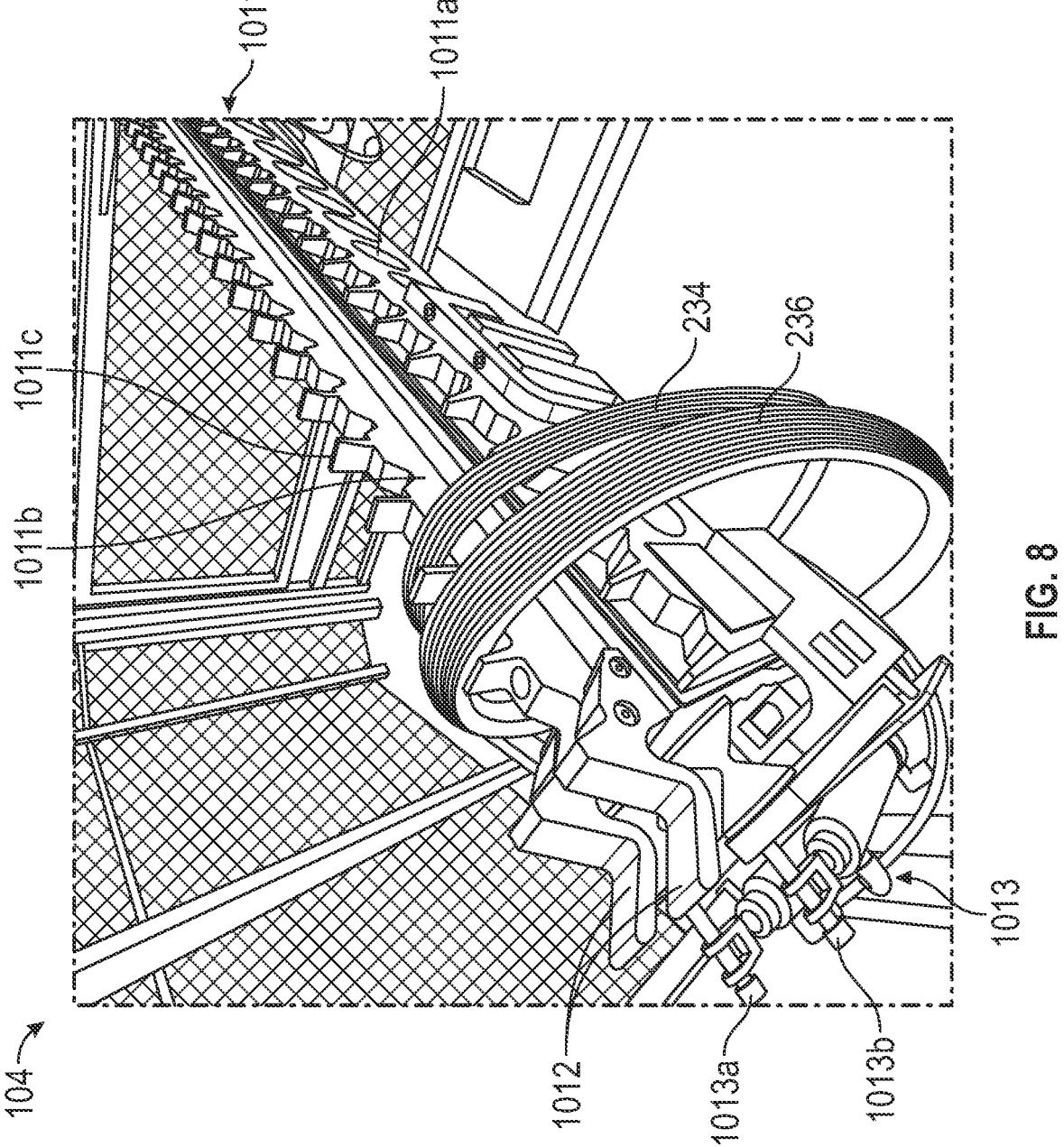
FIG. 8 shows an exemplary walking beam of the gasket retrieval and gasket stretching and alignment substations of the present disclosure.

As shown in FIGS. 7 and 8, the gasket retrieval substation 104, disposed at a location proximate to the gasket mounting station 106 within the facility cell 101, comprises one or more walking beams 1011. The one or more walking beams 1011 are adapted to carry and transfer a plurality of gaskets 234, 236 in a substantially linear path for retrieval from the walking beam 1011 to the gasket stretching and alignment substation 105 via the gripping elements 130, 230 of the robotic end of arm tool (EOAT) 124, 224. More specifically, the one or more walking beams 1011 each include a movable load supporting walking beam member 1011a and end retrieval mechanism 1013. The movable load supporting walking beam member 1011a comprises a plurality of alternating and repeating notches 1011b and projections 1011c, as depicted in FIG. 8, with a final V-shaped notch 1012 at the retrieval end of the walking beam 1011. This unique pattern is designed such that a variety of different types of gaskets 234, 236 (e.g., soil-tight and water-tight gaskets) with varying widths and geometries can be properly received within the notched sections 1011b (disposed between two projection sections 1011c), free from displacement during movement of the walking beam 1011. In addition, the pattern places the gasket 234, 236 in a proper initial alignment for retrieval by the gripping elements 130, 230 of robotic end of arm tool (EOAT) 124, 224.

The design of the walking beam 1011 is such that the moveable load supporting walking beam member 1011a is moved from a stationary or start position vertically downward, where it acquires the load (e.g., gasket) to be transported. The walking beam 1011 then moves horizontally forward, after which an upward movement deposits the gasket 234, 236 within the next notch 1011b until it reaches the final V-shaped notch 1012 at the retrieval end of the walking beam 1011. Once the gasket 234, 236 is received in the final V-shaped notch 1012, the finger elements 1013a, 1013b of the retrieval end mechanism 1013 blossom outward, lifting the gasket 234, 236. The end retrieval mechanism 1013 therefore functions to provide a predetermined amount of clearance for the gripping elements 130, 230 of the robotic end of arm tool (EOAT) 124, 224 to retrieve the gasket 234, 236 therefrom.

Gasket Stretching and Alignment Substation

Figure 9:
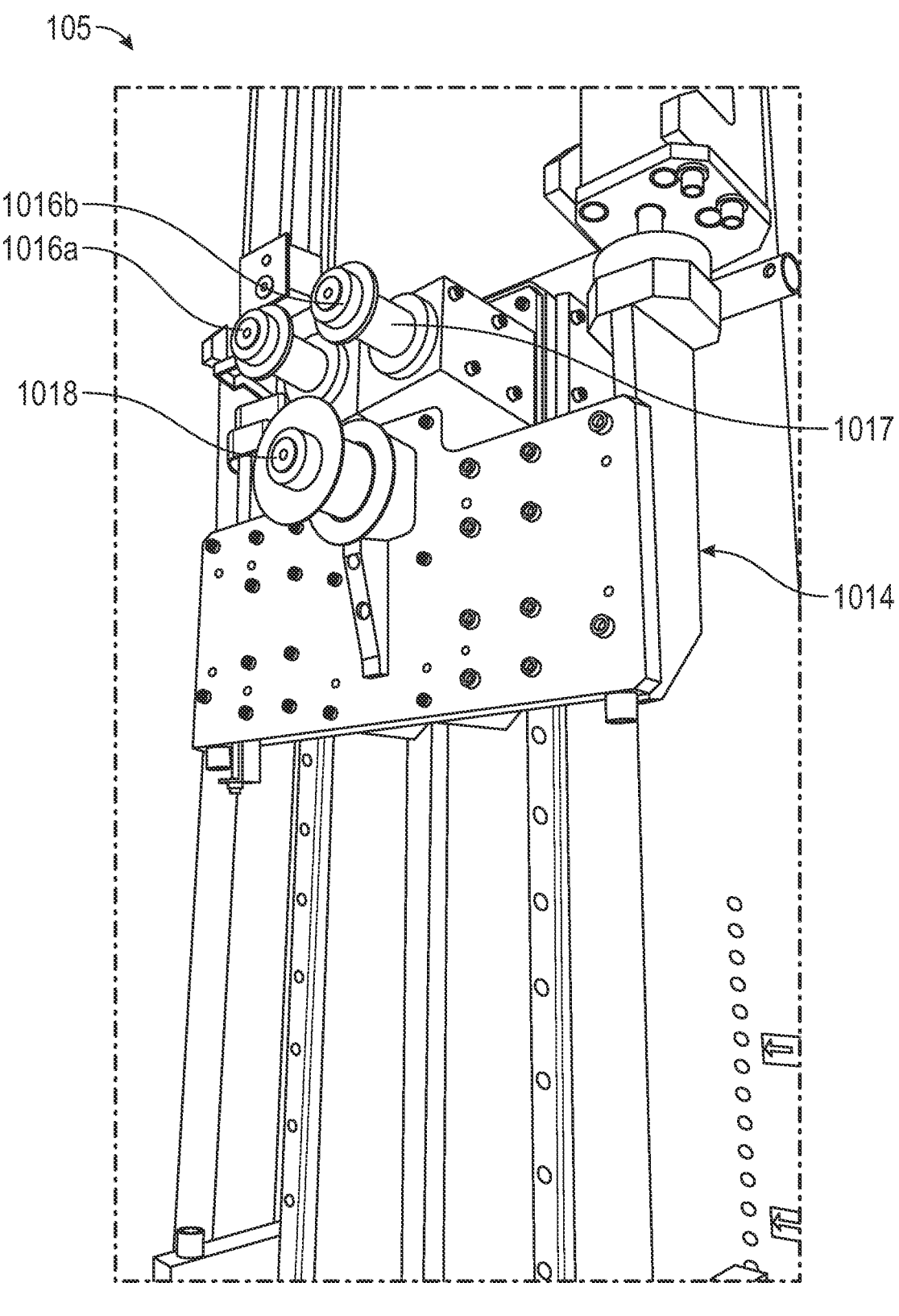
FIG. 9 shows an exemplary stretching and alignment substation of the present disclosure.
Figure 10A:
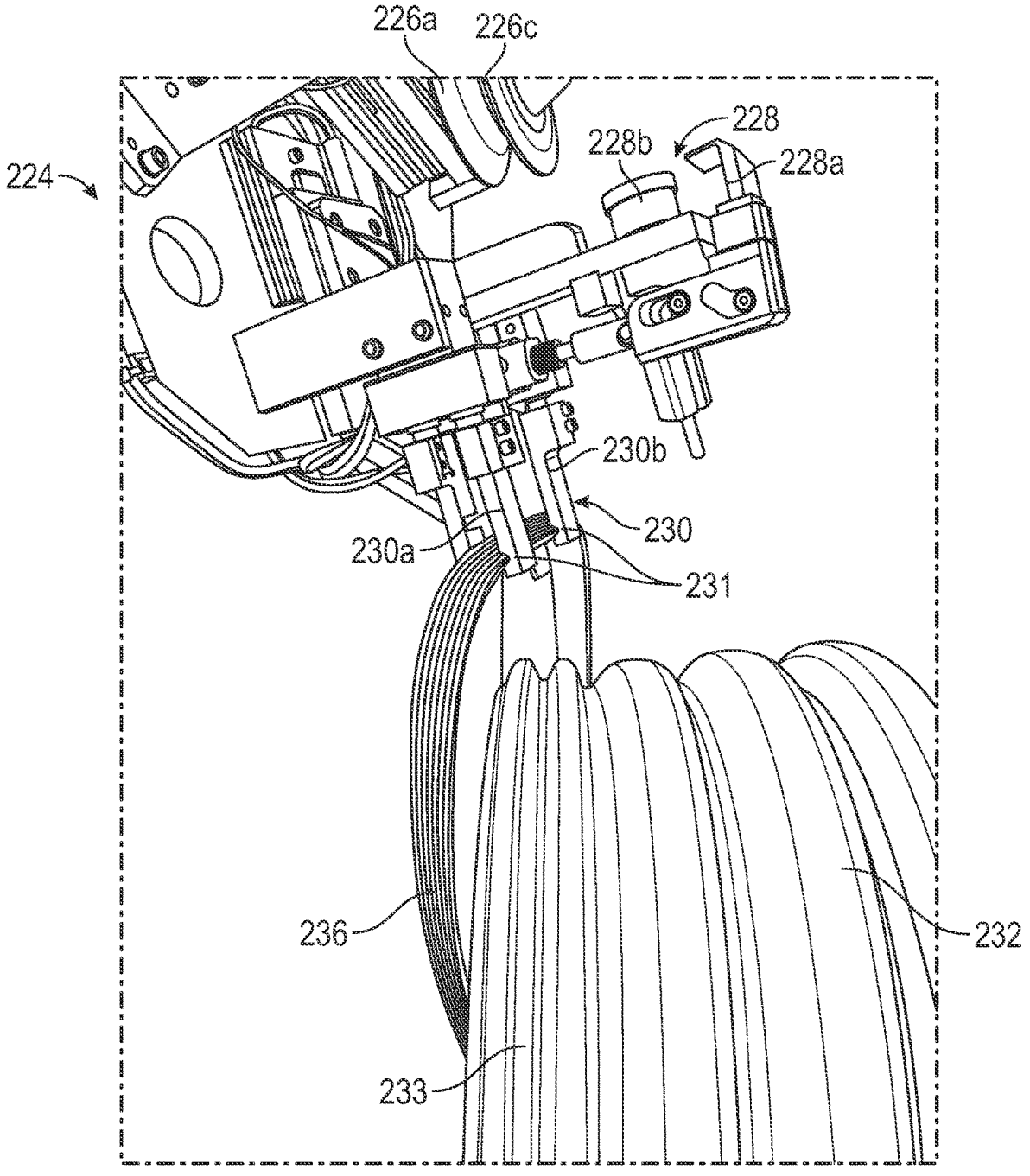
FIG. 10A is a schematic perspective view of an exemplary mounting station and gasket installation process of the present disclosure, wherein the gasket gripping elements of the end of arm tool (EOAT) retrieve and transport a gasket to the mounting station.
Figure 10B:
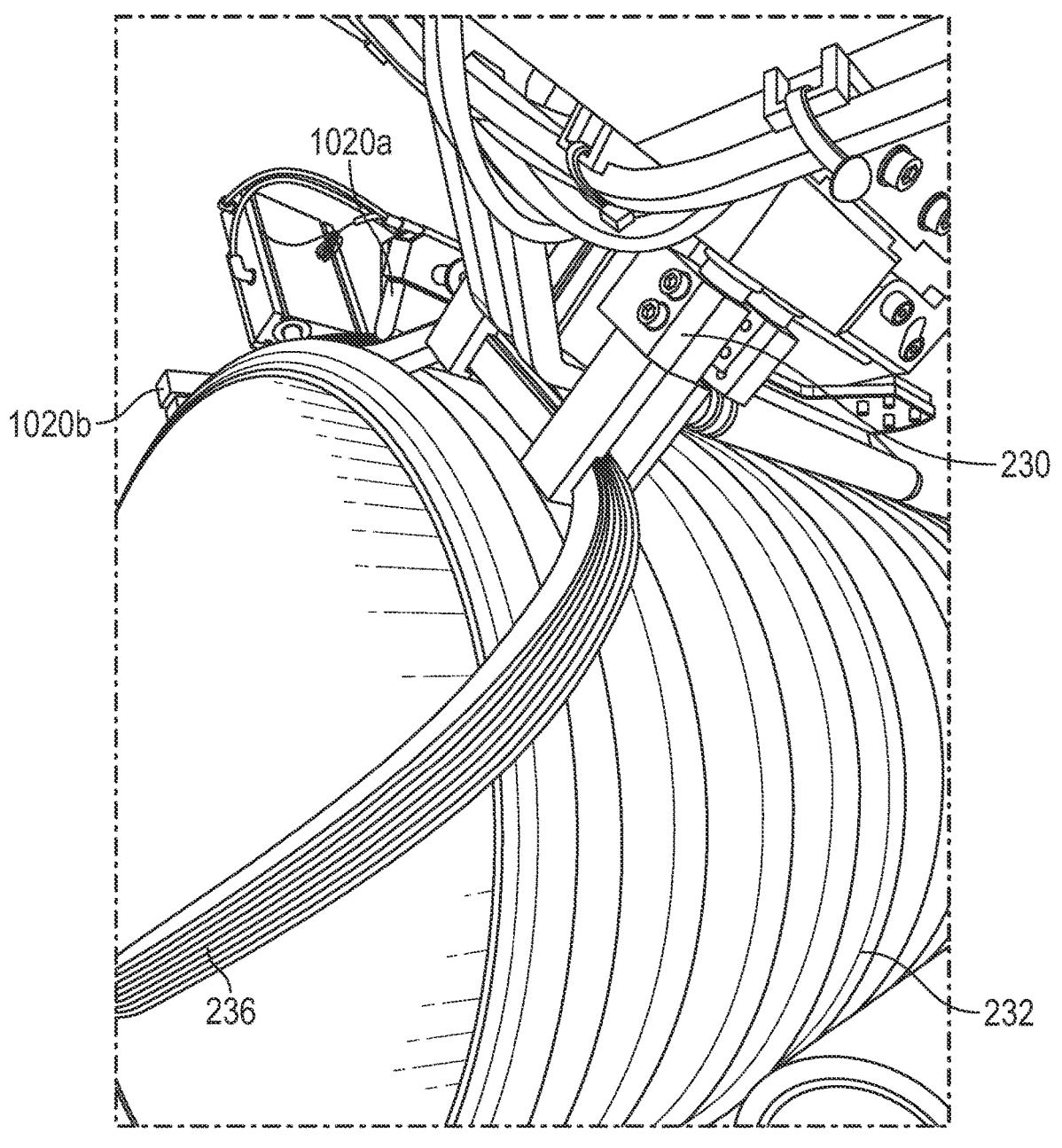
FIG. 10B is a schematic perspective view of an exemplary mounting station and gasket installation process of the present disclosure, wherein the gasket gripping elements of the end of arm tool (EOAT) and pressing device initially position the gasket with the pipe spigot groove defined by the outer surface of the top portion of the pipe.
Figure 10C:
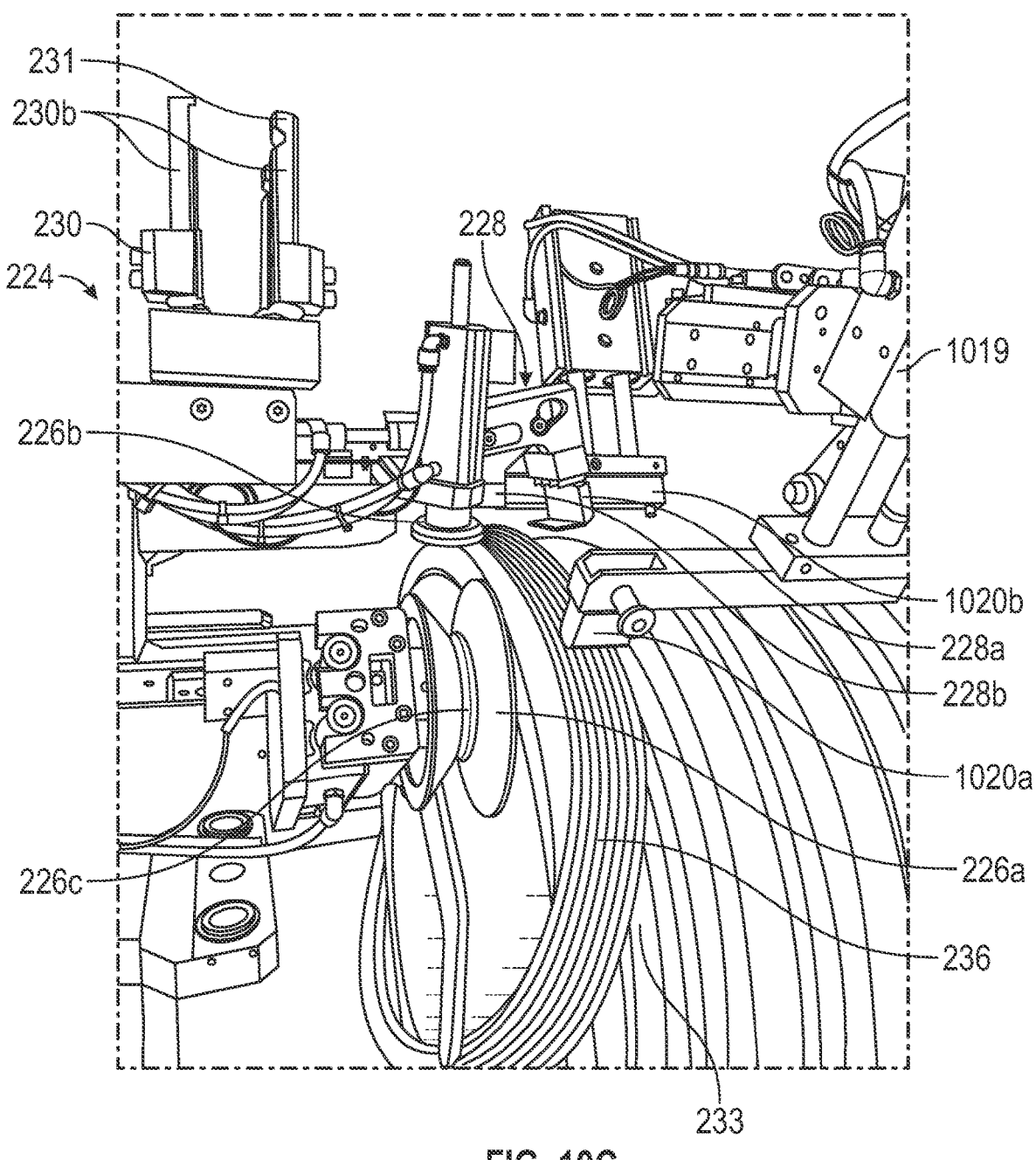
FIG. 10C is a schematic perspective view of an exemplary mounting station and gasket installation process of the present disclosure, wherein the pressing device exerts pressure onto the gasket to hold the gasket within the pipe spigot groove.
Figure 10D:
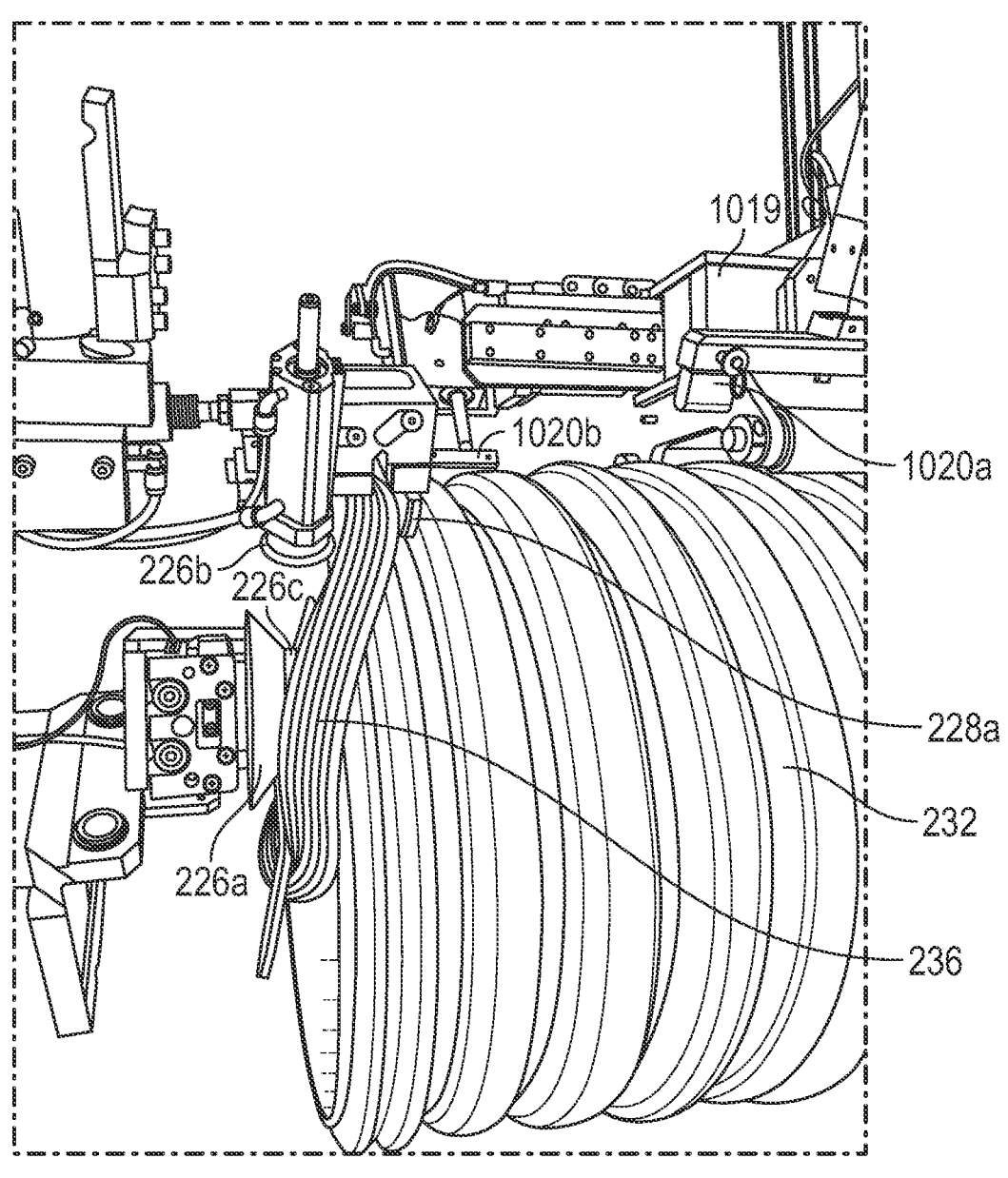
FIG. 10D is a schematic perspective view of an exemplary mounting station and gasket installation process of the present disclosure, wherein the shoehorn mechanism and plurality of interconnected geometric rollers of the end of arm tool (EOAT) are aligned to further install the gasket onto the pipe.
Figure 10E:
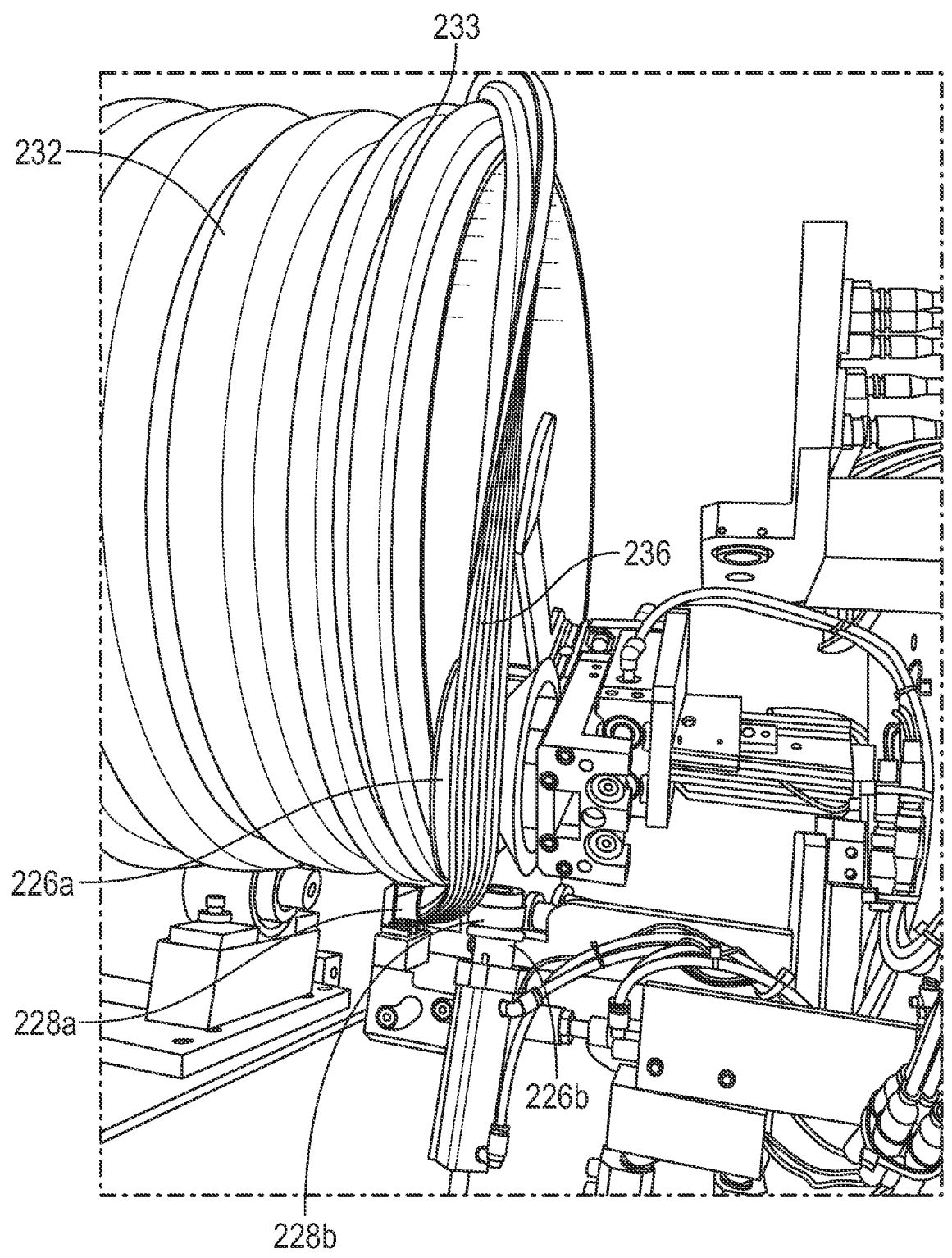
FIG. 10E is a schematic perspective view of an exemplary mounting station and gasket installation process of the present disclosure, wherein the end of arm tool (EOAT) rotates around the pipe to secure the gasket within the pipe spigot groove defined by the outer surface of the pipe.

Next, the robotic end of arm tool (EOAT) 124, 224 transports the retrieved gasket 234, 236 via the gripping elements 130, 230 to the gasket stretching and alignment substation 105. As seen in FIG. 9, the gasket stretching and alignment substation 105 may comprise a stretching device 1014 and vision system 1015. More specifically, the stretching device 1015 is comprised of a set of stationary top holding elements 1016a, 1016b and a movable bottom stretching pin 1018.

The stretching device 1014 functions to pre-stretch the gasket 234, 236 prior to installation to help ensure a proper seal as well as lack of buckling and/or twisting. Pre-stretching can help the gasket conform to irregular surfaces, compensate for thermal expansion and contraction, and reduce the likelihood of relaxation or creep over time.

To stretch the gasket 234, 236, the gasket 234, 236 is first placed over the set of top holding elements 1016a, 1016b via the gripping elements 130, 230 of the end of arm tool (EOAT) 124, 224 such that the top interior of the gasket comes into contact with each of the holding element tracks 1017. In this position, the top interior portion of the gasket 234, 236 is held in place upon the tracks 1017 and a bottom interior portion of the gasket 234, 236 is disposed about a bottom stretching pin 1018. The bottom stretching pin 1018, moveable in a vertical direction, functions to pre-stretch the gasket 234, 236 to a predetermined length G for a predetermined duration or until the gasket 234, 236 maintains the predefined length G that is defined between the top interior portion and the bottom interior portion thereof. For example, the gasket 234, 236 may be stretched to a predetermined length G of from about 12 inches to about 30 inches. By way of another example, the gasket 234, 236 may be stretched to a predetermined length G of 12 inches, 15 inches, 18 inches, 24 inches, or 30 inches or more depending on the type of gasket being installed.

Once the gasket is placed on the stretching device 1014, the end of arm tool (EOAT) 124, 224 retracts away from the device 1014. Stretching occurs when the bottom stretching pin 1018 moves in a downward vertical direction from a pre-stretch start position near the set of top holding elements 1016a, 1016b to a post-stretch position, away from the set of top holding elements 1016a, 1016b. Once stretched, the bottom stretching pin 1018 returns (moves in an upward direction) to its initial pre-stretch start position. Placement of the gasket 234, 236 onto the stretching device 1018 and the subsequent stretching provides secondary alignment to the gasket 234, 236 allowing the gripping elements 130, 230 of the robot end of arm tool (EOAT) 124, 224 to have an improved, more repeatable gripping of the gasket prior to installation on the pipe 232. In other words, placement of the gasket 234, 236 on the stretching device 1014 for later retrieval by the gripping elements 130, 230 helps orient the gasket 234, 236 in the proper position for installation.

Next, the robot end of arm tool (EOAT) 124, 224 advances toward the stretching device 1014 and removes the gasket 234, 236 via the gripping elements 130, 230. Once the gripping elements 130, 230 of the end of arm tool (EOAT) 124, 224 remove the stretched gasket, the end of arm tool (EOAT) faces a vision system 1015. The vision system 1015 of the gasket stretching and alignment substation 105 functions to confirm presence of the gasket as well as proper alignment of the gasket 234, 236 within the gripping elements 130, 230 upon retrieval. More specifically, the vision system 1015 will take a picture of the end of arm tool (EOAT) 124, 224 and evaluate the resultant image to confirm presence and proper alignment of the respective gasket 234, 236.

Mounting Station

Once the gasket is stretched, aligned, and proper sizing, orientation, and alignment are confirmed, the gripping elements 130, 230 of the end of arm tool (EOAT) 124, 224 retrieve and transport the gasket 234, 236 to the mounting station 106. As shown in FIGS. 10A-10E, the mounting station 106 may comprise a plurality of parallel pipe-holding rollers 1008, a pressing device 1019, and a vision system 1021.

The plurality of parallel pipe-holding rollers 1008 comprise at least two rollers positioned adjacent to each other, that function together to maintain the pipe 232 in the space therebetween. In one non-limiting example, a first set and a second set of parallel pipe-holding rollers 1008a, 1008b are utilized. In such an example, the first set of parallel pipe-holding rollers 1008a is positioned substantially parallel to the pipe's longitudinal axis Y proximate the spigot end (male end) 232b of the pipe 232. The second set of parallel pipe-holding rollers 1008b is positioned substantially parallel to the pipe's axis longitudinal axis Y proximate the bell end (female end) 232a of the pipe 232. The one or more sets of parallel pipe-holding rollers 1008a, 1008b are further configured to rotate, such that the pipe 232 held thereby and disposed therebetween rotates along with the parallel pipe-holding rollers 1008a, 1008b.

The pressing device 1019, may be disposed at a location above the pipe 232 proximate the spigot end (male end) 232b. The pressing device 1019 may further comprise one or more pressing arms 1020a, 1020b which function to exert pressure onto the gasket 234, 236 and hold the respective gasket 234, 236 within the pipe spigot groove 133, 233 while the plurality of interconnected geometric rollers 126, 226 and shoehorn mechanism 128, 228 of the end of arm tool (EOAT) 124, 224 further install the gasket 234, 236 onto the pipe 232. Furthermore, the one or more pressing arms 1020a, 1020b of the pressing device 1019 may be maintained in a stationary position, retracting only to allow the shoehorn mechanism 128, 228 on the end of arm tool (EOAT) 124, 224 to pass thereunder during rotation around the centerline of the pipe 232. For example, one pressing arm 1020a may be located at or near a start position of the pipe 232 and a second pressing arm 1020b may be located at or near an end position of the pipe 232. Once rotation is initiated, start position pressing arm 1020a will retract to allow the shoehorn mechanism 128, 228 to pass. The end position pressing arm 1020b will then continue to exert pressure onto the gasket 234, 236 while the plurality of interconnected geometric rollers 126, 226 and shoehorn mechanism 128, 228 of the end of arm tooling module 124, 224 further install the gasket 234, 236 onto the pipe 232. Once the end of arm tooling module 124, 224 reaches a point near the end position, the end position pressing arm 1020b will retract to allow the end of arm tool (EOAT) 124, 224 to pass and complete installation of the gasket 234, 236 onto the pipe 232. The one or more arms 1020a, 1020b of the pressing device 1019 may be servo-driven, and their movement may be controlled by the control system.

Lastly, the vision system 1021 of the mounting station 106 functions to confirm proper installation of the gasket. More specifically, the vision system 1021 may comprise one or more cameras. For example, a system comprising two cameras may be arranged such that one camera is on either side of the first set of parallel pipe-holding rollers 1008a. The cameras 1021, during installation of the gasket, will take a series of continuous images during rotation of the pipe 232, inspecting the entire circumference of the pipe 232 and gasket 234, 236 to confirm that the gasket 234, 236 is seated properly within the pipe spigot groove 133, 233 around the entirety of the pipe circumference 232. The vision system 1021 may include a plurality of lights and reflectors to aid in the inspection process.

Referring to the installation of the gasket 234, 236 at the mounting station 106, as shown in FIGS. 10A-10E, the steps are of the mounting process contemplated as detailed herein below. Further, the steps are described as referring to both soil-tight gaskets 234 and water-tight gaskets 236 utilizing the corresponding end of arm tool (EOAT) 124, 224. In other words, the steps in the installation of soil-tight gaskets 234 and water-tight gaskets 236 are substantially the same, except installation of the soil-tight gaskets 234 utilizes the soil-tight adapted end of arm tool (EOAT) 124 and installation of water-tight gaskets 236 utilizes the water-tight adapted end of arm tool (EOAT) 224. Further, the pipe 232, although herein described generally, may be a specifically manufactured pipe corresponding to the respective gasket 234, 236 to be installed thereon via the installation process 100. For example, it is understood that a soil-tight gasket 234 may be installed on a corresponding soil-tight pipe, specifically manufactured to receive the respective soil-tight gasket 234. Furthermore, it is understood that a water-tight gasket 236 may be installed on a corresponding water-tight pipe, specifically manufactured to receive the respective water-tight gasket 236.

Turning now to the mounting process at mounting station 106, first a gasket 234, 236 is placed onto pipe 232 at a top portion of the pipe 232 within the pipe spigot groove 133, 233. Initial placement of the gasket 234, 236 is aided by a plurality of gripping elements 130, 230 and the pressing device 1019. More specifically, as detailed herein above, the gasket 234, 236 is inserted into the space between the first and second arms 130a, 130b, 230a, 230b of the gripping elements 130, 230 such that the outer edges of the gasket 234, 236 are received by the first and second arm notches 131, 231 to ensure proper initial placement and orientation of the gasket 234, 236. The plurality of gripping elements 130, 230 then initially lift the gasket 234, 236 onto the pipe 232 within the pipe spigot groove 133, 233. Next, the pressing device 1019 is lowered onto the top portion of the pipe 232. The second pressing arm 1020b extends outward, initially exerting pressure onto the gasket 234, 236 within the pipe spigot groove 133, 233 at or near the end position of the pipe 232. The gripping elements 130, 230 begin to rotate around the top portion of the pipe 232, guiding the gasket 234, 236 such that the gasket is seated within the pipe spigot groove 133, 233. Once a portion of the gasket 234, 236 is received within the top portion of the pipe spigot groove 133, 233, the first pressing arm 1020a then extends outward, to exert pressure onto the gasket 234, 236 and hold it in place at or near the start position of the pipe 232. The gripping element 130, 230 of the end of arm tool (EOAT) 124, 224 then disengages from the gasket 234, 236, now held in place by the first and second arms of the pressing device 1020a, 1020b. The end of arm tool (EOAT) 124, 224 then retracts from the pipe.

Next, the end of arm tool (EOAT) 124, 224 advances to an initial start position, rotating 180 degrees, such that the primary roller 126a, 226a of the plurality of interconnected geometric rollers 126, 226 faces the edge of the pipe 232. The primary roller 126a, 226a then advances linearly, placing the face of the primary roller 126a, 226a to the edge of the pipe. The primary roller 126a, 226a then advances outward, abutting the primary roller pilot 127, 227 to the inner pipe surface. The first pressing arm 1020a retracts to allow the end of arm tool (EOAT) 124, 224 to begin rotation.

Thereafter, the shoehorn mechanism 128, 228 and secondary roller 126b, 226b retract downward. The shoehorn mechanism 128, 228 contacts and maintains pressure on the outside diameter of the pipe 232 during the entire gasket installation process. Next, the secondary roller 126b, 226b advances downward onto the pipe 232. The robot end of arm tool (EOAT) 124, 224 begins to rotate in a clockwise and counterclockwise rotation around the pipe, securing the gasket 234, 236 within the pipe spigot groove 133, 233 of the pipe 232. This back-and-forth rotation by the module 124, 224 maintains the alignment of the gasket 234, 236 while the placement of the gasket 234, 236 is properly balanced out throughout the entire circumference of the pipe 232. Once the end of arm tooling module 124, 224 reaches a position near the second pressing arm 1020b, the second pressing arm 1020b retracts to allow the module to complete the installation process.

Once installation is complete, the robot end of arm tool (EOAT) 124, 224 rotates to face the vision system 1015 of the gasket stretching and alignment substation 105. The vision system 1015 confirms that the gripping elements 130, 230 of end of arm tool (EOAT) 124, 224 are empty i.e., do not contain a gasket. If required, the end of arm tool (EOAT) 124, 224 will advance to the gasket retrieval substation 104 to retrieve another gasket for mounting onto the pipe 232 in another pipe spigot groove 133, 233. If the pipe 232 only has one pipe spigot groove 133, 233, and thus only requires the installation of one gasket 234, 236, the mounting process is complete.

Next, the pipe 232 is then advanced temporarily to a platform unit 1006 adjacent the next station (the film application station 107) via a retractable pushing mechanism 1007 located in the space between the two parallel pipe holding rollers. The pushing mechanism raises, thereby causing the pipe to disengage from its seated position and roll onto the adjacent platform unit 1006. The platform unit 1006 may comprise one or more platforms that independently or collectively raise or lower in position to aid in the advancement of the pipe 232 to the parallel pipe holding rollers 1008a, 1008b of the film application station 107 where the pipe, on the gasket portion thereof, receives one or more types of film.

Film Application Station

The film application station 107, as seen in FIG. 5, comprises parallel pipe holding rollers 1008a, 1008b, as described herein above and robot with film application end of arm tool (EOAT) having one or more film application tools. The one or more film application tools may further include a film application roll dispenser and film application clamp. The film application station 107 also includes a heat roller to heat bond the loose end of the film after application and a pipe clamp to initially hold the film in place on the gasket portion of the pipe 232. The film application station 107 functions to wrap one or more types of stretch film over the installed gasket to protect the gasket during storage, shipment, or the like until the pipe is installed by an operator at an off-site location. The one or more layers of stretch film may comprise a single type of stretch film comprising all layers, or several different types of stretch film comprising the individual layers. Examples of suitable commercially available stretch films may include UV protectant stretch film, color stretch film (to indicate the type of pipe), and/or reinforcement stretch film. Suitable stretch films may be formed of polyolefin, polypropylene, linear low-density polyethylene resins or the like.

By one non-limiting example, the film application end of arm tool (EOAT) with film application tools installed hereon first locates the edge of the pipe 232 via the vision system 1015. The film application end of arm tool (EOAT) then places the film on the gasket 234, 236. The film application clamp initially holds the film in place and retracts once a predetermined amount of film is applied to the gasket 234, 236. The film application end of arm tool (EOAT) then rotates around the pipe 232, in a clockwise direction. The film application roll dispenser of the film application end of arm tool (EOAT) applies the film to the gasket 234, 236. The film application end of arm tool (EOAT) may rotate about the pipe 232 one or more times, applying one or more layers of film to the gasket. Once the desired number of layers are applied, the film application clamp of the film application end of arm tool (EOAT) extends and clamps the film. The heat roller is then applied to the film, cutting and heat bonding the film to the gasket 234, 236. If desired, a secondary film is applied to the gasket, over the first-applied film, in the manner as described above (e.g., a color film to identify the type of pipe may be applied as a top layer).

Once film application is complete, the pipe 232 then remains within the parallel pipe holding rollers 1008a, 1008b of the film application station 107 while the barcode placement substation 108 places a barcode onto the pipe.

Barcode Placement Substation

Lastly, the barcode placement substation comprises a barcode printer. The barcode placement substation 108 functions to place a barcode in a predetermined position on the interior spigot end (male end) of the pipe 232. For example, the film application end of arm tool (EOAT) may enter the interior spigot end (male end) of the pipe 232 and orient a barcode with adhesive to a green stripe upon the pipe inner surface, a reference mark included during the manufacturing process of the pipe to indicate type or quality of the pipe 232.

Once the barcode is placed onto the pipe 232, the pipe 232 is then advanced temporarily to a platform unit 1006 adjacent the pipe exit door 109 via a retractable pushing mechanism 1007 located in the space between the two parallel pipe holding rollers of the film application station 107. The pushing mechanism raises, thereby causing the pipe 232 to disengage from its seated position and roll onto the adjacent platform unit 1006. The pipe 232 is then removed from the facility cell 101 via the pipe exit door 109, which opens in response to a completion signal from the control system. The pipe exit door 109 then closes until the next pipe 232 completes the barcode placement 108 process.

In the manner described above, the gasket installation apparatus and process of the present teachings allows for the proper orientation, mounting, and installation of gaskets onto molded pipes.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

| LISTING OF REFERENCE NUMERALS | |
|---|---|
| 100 | Gasket Installation Process |
| 101 | Gasket Installation Facility Cell |
| 102 | Pipe Loading Station |
| 103 | Pipe Cutting and Deburring Station |
| 104 | Gasket Retrieval Substation |
| 105 | Gasket Stretching and Alignment Substation |
| 106 | Mounting Station |
| 107 | Film Application Station |
| 108 | Barcode Placement Substation |
| 109 | Pipe Exit Door |
| 110a | Perimeter Fence (of the Facility Cell) |
| 110b | Perimeter Fence Access Doors |
| 120 | Gasket Installation Apparatus |
| 122 | Robotic Arm |
| 124 | End of Arm Tool (EOAT) (Soil-tight Gaskets) |
| 126 | Geometric Rollers (Soil-tight Gaskets) |
| 126a | Primary Roller |
| 126b | Secondary Roller |
| 127 | Primary Roller Pilot |
| 128 | Shoehorn Mechanism (Soil-tight Gaskets) |
| 128a | Shoehorn Element (of Shoehorn Mechanism 128) |

-continued

LISTING OF REFERENCE NUMERALS

| | |
|---|---|
| 128b | Pin Element (of Shoehorn Mechanism 128) |
| 130 | Gasket Gripping Elements (Soil-tight Gaskets) |
| 130a | First Arm (of Gripping Element 130) |
| 130b | Second Arm (of Gripping Element 130) |
| 131 | Notches (of First and Second Arm 130a, 130b) |
| 133 | Pipe Spigot Groove |
| 224 | End of Arm Tool (EOAT) (Water-tight Gaskets) |
| 226 | Geometric Rollers (Water-tight Gaskets) |
| 226a | Primary Roller |
| 226b | Secondary Roller |
| 227 | Primary Roller Pilot |
| 228 | Shoehorn Mechanism (Water-tight Gaskets) |
| 228a | Shoehorn Element (of Shoehorn Mechanism 228) |
| 228b | Roller Element (of Shoehorn Mechanism 228) |
| 230 | Gasket Gripping Elements (Water-tight Gaskets) |
| 230a | First Arm (of Gripping Element 230) |
| 230b | Second Arm (of Gripping Element 230) |
| 231 | Notches (of First and Second Arm 230a, 230b) |
| 232 | Pipe |
| 232a | Bell End (Female End of Pipe 232) |
| 232b | Spigot End (Male End of Pipe 232) |
| 233 | Pipe Spigot Groove |
| 234 | Gasket (Soil-tight) |
| 236 | Gasket (Water-tight) |
| 1002 | Pipe Loading Conveyor System |
| 1004 | Conveyor Belt |
| 1004a | First Opposing End (of Conveyor Belt 1004) |
| 1004b | Second Opposing End (of Conveyor Belt 1004) |
| 1006 | Platform Unit |
| 1007 | Pushing Mechanism (of Parallel Pipe-Holding Rollers 1008) |
| 1008 | Parallel Pipe-Holding Rollers |
| 1008a | First Set of Parallel Pipe-Holding Rollers |
| 1008b | Second Set of Parallel Pipe-Holding Rollers |
| 1009 | Knife Cutting and Deburring System |
| 1010 | Conveyor Belt |
| 1011 | Walking Beam |
| 1011a | Moveable Load Supporting Walking Beam Member |
| 1012 | Final V-shaped Notch |
| 1013 | End Retrieval Mechanism |
| 1014 | Stretching Device |
| 1015 | Vision System |
| 1016 | Set of Top Holding Elements |
| 1016a | First Top Holding Element |
| 1016b | Second Top Holding Element |
| 1017 | Holding Element Tracks |
| 1018 | Bottom Stretching Pin |
| 1019 | Pressing Device |
| 1020a | First Pressing Arm |
| 1020b | Second Pressing Arm |

What is claimed is:

1. An apparatus configured to install a gasket into a groove, the apparatus comprising:

a robotic arm comprising at least one end of arm tool;

a plurality of gripping elements coupled to the end of arm tool, the gripping elements each comprising an arm having an inner surface, wherein the inner surface defines at least one notch, wherein each of the gripping elements is configured to receive a gasket within the notch and transport the gasket to a mounting station; and a plurality of interconnected rollers and a shoehorn mechanism each coupled to the end of arm tool, wherein the end of arm tool is adapted to rotate around a circumference of a pipe defining the groove, such that the plurality of interconnected rollers and shoehorn mechanism align and install the gasket into the groove.

2. The apparatus of claim 1, wherein the shoehorn mechanism is configured to substantially contact and maintain a predetermined pressure on a surface of the gasket to thereby guide the gasket into the groove as the end of arm tool rotates around the circumference of the pipe.

3. The apparatus of claim 2, wherein the shoehorn mechanism is adapted for installation of soil-tight gaskets.

4. The apparatus of claim 2, wherein the shoehorn mechanism is adapted for installation of water-tight gaskets.

5. The apparatus of claim 1, wherein the plurality of interconnected rollers further comprises:

a primary roller having a primary roller track and primary roller pilot, wherein the primary roller is configured to receive a portion of the gasket within the primary roller track when the primary roller pilot abuts an inner surface of the pipe and the end of arm tool rotates around the circumference of the pipe; and a secondary roller that contacts the gasket to thereby push the gasket into the groove during rotation of the end of arm tool around the circumference of the pipe.

6. A gasket installation facility cell for mounting a gasket onto a pipe, wherein the gasket installation facility cell is provided with a pipe having a pipe body disposed on a pipe axis and defining an inner pipe surface and an outer pipe surface, the pipe body having a spigot end and a bell end opposite the spigot end, wherein the outer pipe surface defines at least one pipe spigot groove disposed at the spigot end and extending about an outer circumference of the pipe, the at least one pipe spigot groove configured to receive a gasket, the gasket installation facility cell comprising:

a mounting station comprising:

a robotic arm comprising an end of arm tool adapted to rotate around the circumference of the pipe, the end of arm tool further comprising:

a plurality of gripping elements coupled to the end of arm tool;

a plurality of interconnected rollers and a shoehorn mechanism each coupled to the end of arm tool, wherein the plurality of interconnected rollers and shoehorn mechanism align and install the gasket into the at least one pipe spigot groove, as the end of arm tool rotates about the circumference of the pipe;

a plurality of parallel-pipe holding rollers configured to maintain a position of the pipe therebetween;

a pressing device having one or more pressing arms, the pressing device being disposed at a location above the pipe proximate the spigot end; and a vision system positioned within the mounting station, the vision system configured to capture a plurality of images during gasket installation to confirm a presence of the gasket within the pipe spigot groove and a positioning of the gasket in an installation orientation.

7. The gasket installation facility cell of claim 6, wherein each of the gripping elements further comprise:

a first arm having first arm inner surface, wherein the first arm inner surface defines a first notch;

a second arm having a second arm inner surface, wherein the second arm inner surface defines a second notch; and wherein the first arm and the second arm are collectively configured to receive a gasket within the first notch and the second notch and transport the gasket to the at least one pipe spigot groove.

8. The gasket installation facility cell of claim 7, wherein the plurality of interconnected rollers further comprises:

a primary roller having a primary roller track and a primary roller pilot, wherein the primary roller is configured to receive a portion of the gasket within the primary roller track when the primary roller pilot abuts the inner pipe surface and the end of arm tool rotates around the circumference of the pipe; and a secondary roller that contacts the gasket to thereby push the gasket into the pipe spigot groove during rotation of the end of arm tool around the circumference of the pipe.

9. The gasket installation facility cell of claim 8, wherein the shoehorn mechanism is configured to substantially contact and maintain a predetermined pressure on a surface of the gasket to thereby guide the gasket into the pipe spigot groove as the end of arm tool rotates around the circumference of the pipe.

10. The gasket installation facility cell of claim 9, wherein the plurality of parallel-pipe holding rollers further comprises:

a first set of parallel-pipe holding rollers positioned proximate to the spigot end of the pipe, and wherein the first set of parallel-pipe holding rollers are adapted to maintain the spigot end of the pipe therebetween; and a second set of parallel-pipe holding rollers positioned proximate to the bell end of the pipe, and wherein the second set of parallel-pipe holding rollers are adapted to maintain the bell end of the pipe therebetween.

11. The gasket installation facility cell of claim 10, wherein the pressing device further comprises a first pressing arm and a second pressing arm disposed at a location above the pipe proximate the spigot end and configured to exert a predetermined pressure onto the gasket to maintain the gasket within the pipe spigot groove as the end of arm tool rotates about the circumference of the pipe.

12. The gasket installation facility cell of claim 11, wherein the vision system of the mounting station further comprises one or more cameras configured to capture a plurality of images during gasket installation to confirm a presence of the gasket within the pipe spigot groove and a positioning of the gasket in the installation orientation.

13. The gasket installation facility cell of claim 6, wherein the pipe is one of a corrugated pipe or a smooth-walled pipe.

14. The gasket installation facility cell of claim 6, wherein the gasket is formed from one of a polyethylene material, a polypropylene material, and a polyvinyl chloride material.

15. The gasket installation facility cell of claim 6, further comprising:

a gasket retrieval station comprising at least one walking beam having a walking beam member, wherein the walking beam member further comprises a plurality of alternating and repeating notches and projections, and wherein each of the notches is configured to receive a gasket and house the gasket between the respective adjacent projections.

16. The gasket installation facility cell of claim 15, further comprising:

a gasket stretching and alignment station comprising a stretching device having:

a plurality of stationary top holding elements; and a movable bottom stretching pin;

wherein the plurality of stationary top holding elements are configured to secure the gasket while the movable bottom stretching pin is movable in a vertical direction to pre-stretch the gasket to a predetermined length when prior to mounting onto the pipe.

17. The gasket installation facility cell of claim 16, wherein the gasket stretching and alignment station further comprises a vision system configured to inspect the pre-stretched gasket for defects prior to mounting onto the pipe.

18. The gasket installation facility cell of claim 6, further comprising:

a film application station comprising:

a film application robotic arm comprising at least one film application end of arm tool, the film application end of arm tool comprising:

a film application roll dispenser configured to apply a predetermined length of film to the gasket and the pipe at the pipe spigot groove as the film application end of arm tool rotates about the circumference of the pipe; and a heat roller configured to apply heat to the predetermined length of film to secure the film to the gasket.

19. The gasket installation facility cell of claim 18, wherein the film is one of an ultra-violet protectant film, color film, or reinforcement film.

20. The gasket installation facility cell of claim 18, further comprising:

a barcode placement substation configured to apply a barcode to the inner pipe surface at the spigot end of the pipe.

\* \* \* \* \*